US007302471B2

(12) United States Patent
Hall

(10) Patent No.: US 7,302,471 B2
(45) Date of Patent: Nov. 27, 2007

(54) METHOD FOR REDUCING THE RECEIPT OF UNSOLICITED BULK E-MAIL AND PROVIDING ANONYMITY TO AN EMAIL-USER

(75) Inventor: Rob Hall, Nepean (CA)

(73) Assignee: Momentous.CA Corporation, Nepean, Ontario (CA)

( * ) Notice: Subject to any disclaimer, the term of this patent is extended or adjusted under 35 U.S.C. 154(b) by 978 days.

(21) Appl. No.: 10/194,205

(22) Filed: Jul. 12, 2002

(65) Prior Publication Data

US 2004/0205173 A1    Oct. 14, 2004

(51) Int. Cl.
*G06F 15/16*    (2006.01)
*G06F 7/00*    (2006.01)

(52) U.S. Cl. .................. 709/206; 709/207; 709/224; 709/232

(58) Field of Classification Search ................ 709/225, 709/206, 207, 224, 232
See application file for complete search history.

(56) References Cited

U.S. PATENT DOCUMENTS

2006/0224678 A1* 10/2006 Hall ......................... 709/206

* cited by examiner

*Primary Examiner*—Zami Maung
(74) *Attorney, Agent, or Firm*—Jon C. Gealow

(57) ABSTRACT

The amount of unsolicited bulk e-mail messages received by an e-mail user is reduced by providing the user with a temporary e-mail address and a permanent e-mail address. The temporary addresses are generated by a server on an ongoing basis. The current temporary address is linked to the permanent e-mail address such that e-mail messages sent to the current temporary address are forwarded to the permanent address and e-mail messages sent to a former temporary address are not forwarded to the permanent address and not received by the user. The method and system also provide a degree of anonymity to the e-mail user.

28 Claims, 3 Drawing Sheets

METHOD FOR REDUCING THE RECEIPT OF UNSOLICITED BULK E-MAIL AND PROVIDING ANONYMITY TO AN EMAIL-USER

This invention relates to a method for reducing the amount of unsolicited bulk e-mail received by an e-mail user and, optionally, providing privacy and anonymity to the user when sending and receiving e-mail messages.

BACKGROUND OF THE INVENTION

The transmission of e-mail messages over the Internet is a form of communication which is being used extensively and increasingly in both the workplace and the home. The capability of individuals to disseminate information over the Internet to large numbers of recipients with relatively minimal effort and cost makes e-mail a particularly attractive mechanism for the dissemination of advertising and promotional material and has spawned a substantial increase in the amount of unsolicited bulk e-mail messages being propagated. The content of these e-mail messages, commonly referred to as "spam", varies widely but in the vast majority of cases, is of no interest to the recipient.

Senders of unsolicited bulk e-mail messages obtain databases of e-mail addresses by a variety of means. Commonly, senders obtain access to a directory such as a "whois" database which identifies one or more contact persons for registered domain names. The database provides the address, telephone number, and e-mail address of the contact person. Thus, a sender may query a "whois" database to obtain a database of e-mail addresses of all contact persons for the domain names in that particular "whois" database. Senders may also create a database of e-mail addresses by scanning web pages posted on the Internet or by querying other databases, both online and offline (i.e. in print), for users' e-mail addresses. Once a database of e-mail addresses has been compiled, it can be sold or otherwise disseminated to any interested person. Regardless of the method used, obtaining a database of e-mail addresses tends to be an extensive/expensive undertaking. As such, even if the sender appreciates that a certain proportion of the e-mail addresses in a database are no longer operative, the number of e-mail addresses in the database assumed to be operative warrants dispatching a bulk e-mail message to all addresses in the database.

The receipt by e-mail users of unsolicited bulk e-mail messages is problematic for a number of reasons. When an e-mail user receives an unsolicited bulk e-mail message, assuming that the user has no interest in the content of the message, the user reviews the message header and either deletes the message without opening it or opens the message, reviews it and then deletes it. Regardless how the e-mail user deals with the e-mail message, the user is required to spend time to review the message and ultimately delete it. If the e-mail user receives a large number of unsolicited bulk e-mail messages, the amount of time taken to deal with them becomes significant. In the workplace, the receipt of unsolicited bulk e-mails by employees negatively impacts on productivity. As well, the time taken by an e-mail user to receive and dispose of unsolicited bulk e-mail messages increases the online and network administration costs of the user or his or her employer. As most users pay for their access to the Internet, and as this access is typically charged based on the amount of time used, the cost of unsolicited bulk e-mails is borne by the receiver, not the sender.

Unsolicited bulk e-mail is also has a negative impact on the infrastructure of the Internet. Internet Service Providers ("ISP's") must use their expensive bandwidth to transmit the bulk messages. In most cases, in addition to transmitting e-mail messages, the ISP also hosts the e-mail of the user until the user retrieves it. Carrying out these functions causes extreme loads on both the network connections and the servers involved. If a small ISP were to have 30,000 users, and each user were to receive an unsolicited bulk e-mail, each message being relatively small (200 words or 1,000 bytes), the ISP would need to import and store on its servers over 30 million bytes (30 Megabytes) of information for that one e-mail message alone. As a typical ISP can receive numerous such e-mail messages per day for its clients, the problem quickly amounts to gigabytes of wasted bandwidth and storage space. For large ISP's with 20 million users or more, one unsolicited bulk e-mail message can use over 20 gigabytes of storage and bandwidth.

To date, there have been few solutions proposed to eliminate or reduce the amount of unsolicited bulk e-mail received by e-mail users. The use of anonymous servers which do not reveal the identity of the e-mail user are known, however, these servers have traditionally simply provided anonymity with a static e-mail address. That is, a user is assigned an e-mail address that he or she can use for both ingoing and outgoing e-mail messages. This e-mail address never changes. Once it becomes known on the Internet, it can therefore be used to send people unsolicited bulk e-mail. Thus, although this system provides a level of anonymity, it does not effectively reduce the flow of unsolicited bulk e-mail.

As the volume of e-mail messages being sent over the Internet increases, e-mail users are an increasingly attractive target for unsolicited mail. The amount of unsolicited bulk e-mail is expected to increase and the problems associated with the receipt of bulk e-mail are therefore expected to worsen. Thus, there is a need for an effective and convenient means for reducing the amount of unsolicited bulk e-mail messages received by e-mail users.

SUMMARY OF THE INVENTION

According to the present invention temporary e-mail addresses are generated on an ongoing basis according to prescribed criteria and are operatively associated with an e-mail user's permanent e-mail address such that all e-mail messages sent to the current temporary e-mail address are forwarded to the user's permanent e-mail address and all e-mail messages sent to temporary e-mail addresses previously associated with the user's permanent e-mail address are not forwarded to the user's permanent e-mail address. Any unsolicited bulk e-mail message sent by a sender who obtained an e-mail user's former temporary e-mail address prior to the current temporary e-mail address becoming operational will not be received by the e-mail user.

Thus in accordance with the present invention there is provided, a system for enabling an e-mail user to avoid receipt of an e-mail message comprising: a first server means for receiving an e-mail message sent to a first e-mail address associated with the user; a second server means for linking said first e-mail address to a second e-mail address associated with the user; a third server means for forwarding said e-mail message from said first server means to said second e-mail address; and a fourth server means for receiving said e-mail message from said second server means and forwarding said e-mail message to the user, wherein said second server means is capable of de-linking said first e-mail address from said second e-mail address to avoid receipt by the user of an e-mail message sent to said first e-mail address.

In accordance with another aspect of the present invention, there is provided, a method for enabling an e-mail user to avoid receipt of an e-mail message comprising: receiving at a first server an e-mail message sent to a first e-mail address associated with the user; linking said first e-mail address to a second e-mail address associated with the user; forwarding said e-mail message from said first server to said second e-mail address at a second server; and receiving said e-mail message from said second server and forwarding said e-mail message to the user, de-linking said first e-mail address from said second e-mail address to avoid receipt by the user of an e-mail message sent to said first e-mail address.

DETAILED DESCRIPTION OF THE PREFERRED EMBODIMENT

Figure 1:
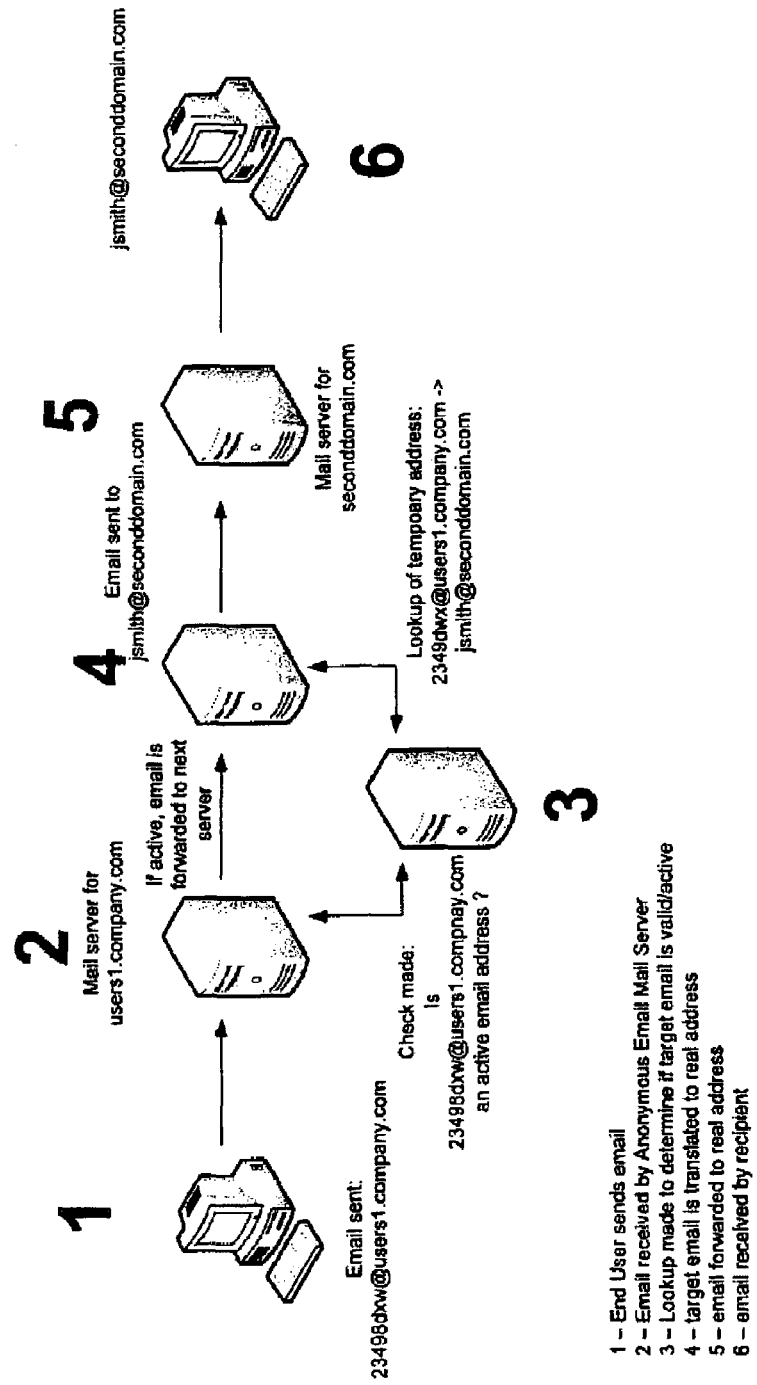
FIG. 1, is a schematic of a system for enabling an e-mail user to avoid receipt of an e-mail message according to one embodiment of the present invention.
Figure 2:
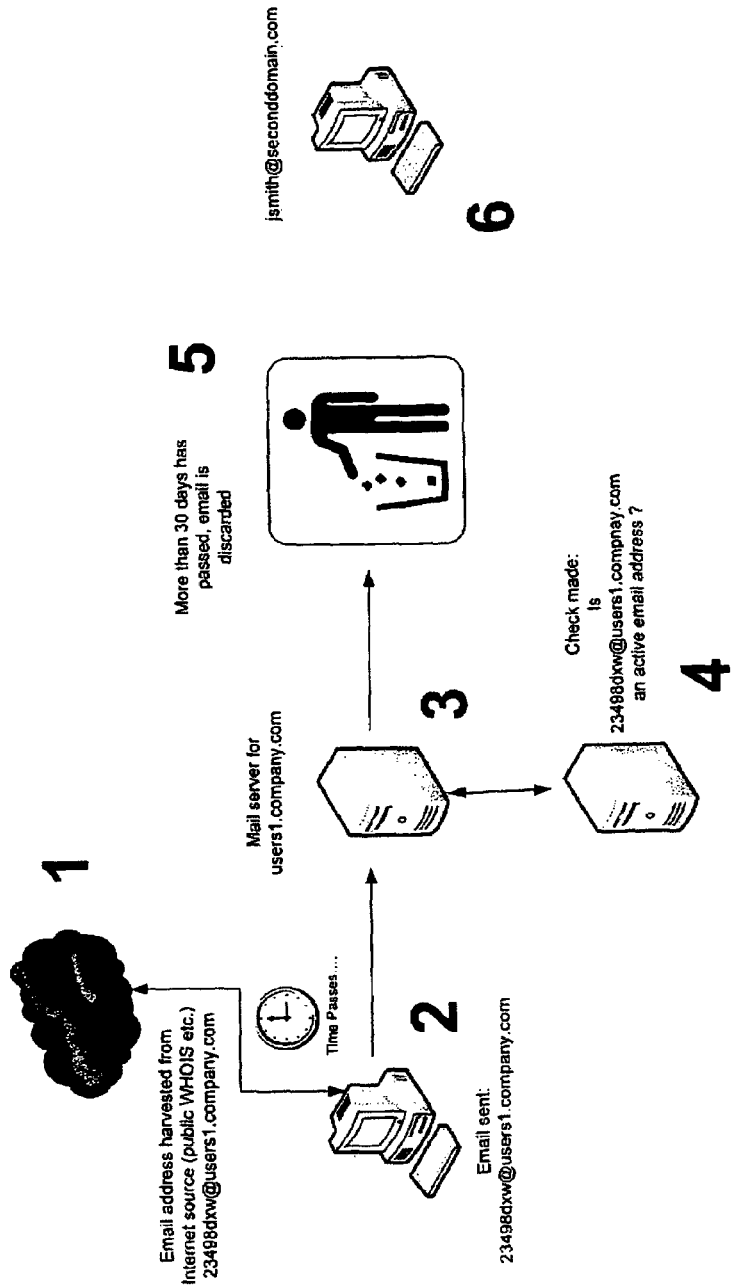
FIG. 2 is a schematic of a system for enabling an e-mail user to avoid receipt of an e-mail message according to another embodiment of the present invention.
Figure 3:
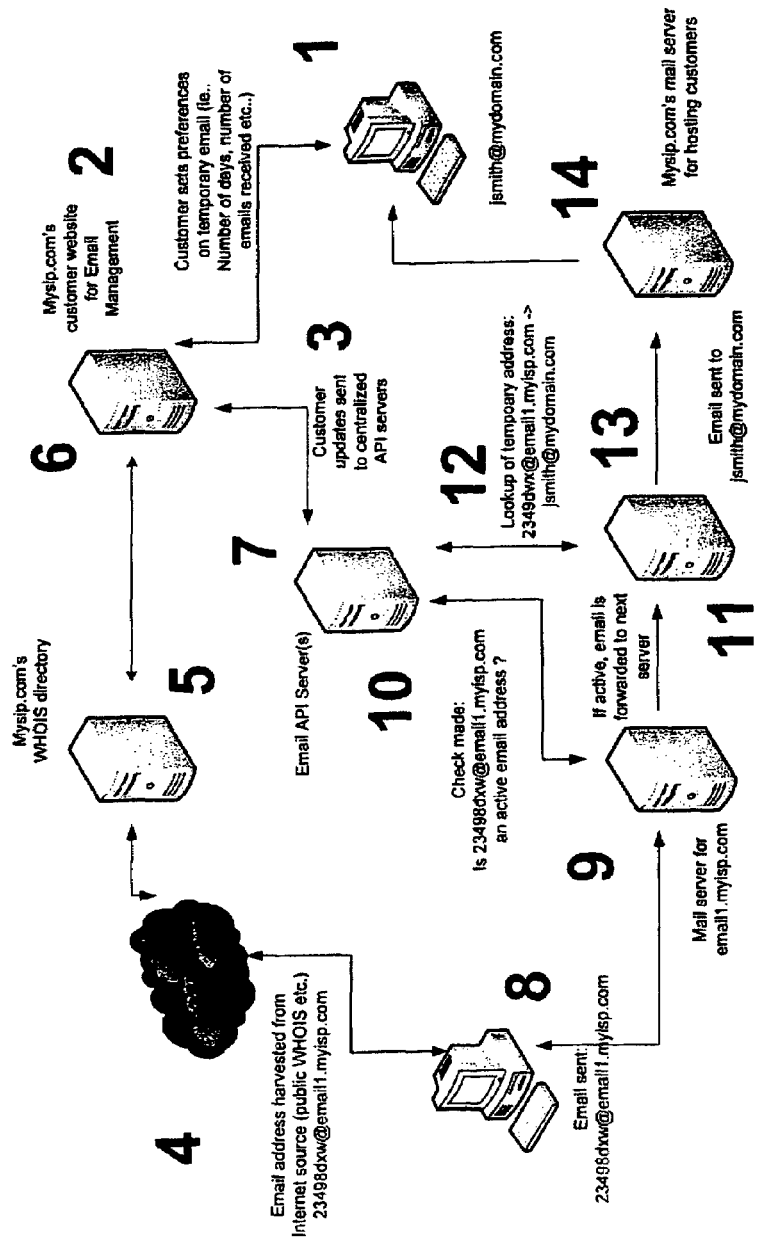
FIG. 3 is a schematic of a system for enabling an e-mail user to avoid receipt of an e-mail message according to still another embodiment of the present invention.

According to the present invention, an e-mail user has a permanent e-mail address consisting of an account name and a domain name. In order to reduce the number of unsolicited bulk e-mail messages that are sent to the permanent e-mail address, the e-mail user is also designated a temporary e-mail address in addition to his or her permanent e-mail address. The temporary e-mail address has two parts, namely a randomly generated component and a static component. Either the randomly generated component or the static component may be of length zero. For example, if the permanent e-mail address of the user is jsmith@company.com, a temporary e-mail address may take the form: (i) 23498dxw@users1.company.com where 23498dxw is a randomly generated component; or (ii) john493@users1.company.com where the static component "john" acts as a client identifier to the ISP or hosting company and 493 is the randomly generated component The randomly generated component may be contained anywhere in the string to the left of the @ sign. For example, the above address could also be 493john@users1.company.com or jo493hn@users1.company.com. In addition, not only can the portion to the left of the @ sign change, but the domain name to the right of the @ sign may also include a randomly generated component. For example, @users1.company.com may be changed to @users3x4.company.com to further provide randomness.

All e-mail messages sent to the user's temporary e-mail address are automatically forwarded by an e-mail server to the user's permanent e-mail address. The forwarding e-mail servers are typically operated by a service provider, ISP, registrar or hosting company. The forwarding server receives the incoming e-mail messages addressed to the user's temporary e-mail address, accepts the address, links the temporary e-mail address to the permanent e-mail address of the user by means of a table or remote lookup facility, and forwards the e-mail message to the e-mail server hosting the permanent e-mail address. Filtering may be performed by the e-mail server prior to forwarding an e-mail message, if desired. The forwarding e-mail server may optionally be used to store a user's e-mail instead of, or in addition to, forwarding the e-mail message.

A user who has been designated a temporary e-mail address in accordance with the present invention may still receive e-mail messages sent directly to his or her permanent e-mail address.

Temporary e-mail addresses are generated and linked to a user's permanent e-mail address by an address generating server. This server is typically operated by the same service provider, ISP, registrar or hosting company as the forwarding server and may run on the same machine as the forwarding server. The generating server is programmed to generate new temporary e-mail addresses according to the foregoing description on an ongoing basis at intervals based on prescribed criteria. The criteria may be time based (eg., the temporary e-mail address is changed every 30 days) or volume based (eg., the temporary e-mail address is changed after 100 new messages are received). The criteria may also be based on the number of times a query has been made for the user's e-mail address in a particular directory. Alternatively, a temporary address may be changed on demand of the e-mail user or other person.

When a new temporary e-mail address is generated, the address generating server informs the e-mail server handling the user's temporary address of the new temporary address as well as the permanent address of that user. Once so informed, all e-mail messages sent to the user's new temporary e-mail address is forwarded to his or her permanent e-mail address and all mail forwarded to the former e-mail address is not forwarded to the user's permanent e-mail address. A message sent to a former temporary e-mail address may be either returned to the sender or simply discarded by the e-mail server.

The user may be notified of his or her new e-mail address when it has changed or may simply be notified of the fact that the temporary address has changed. Such notification may occur by e-mail or other suitable means.

In addition to the e-mail servers and the address generating servers, other servers may be used in the operation of the invention. For example, database servers may be used to provide utility to the function. Interface type servers, such as web servers, may be used to allow the user the ability to interface with either the forwarding server or generating server.

In order for the user to receive an e-mail message, the message must be sent to that user's permanent e-mail address or current temporary e-mail address. E-mail messages sent to temporary e-mail addresses previously associated with the user's permanent e-mail address are not forwarded to the e-mail user's permanent e-mail address. Once the user's temporary e-mail address is changed to an address other than the address known by the sender of unsolicited bulk e-mail, the user will not receive unsolicited bulk e-mail from that sender. Because the user's temporary e-mail address can change more frequently than the sender's database of e-mail addresses can be updated, the invention is effective to avoid the receipt of a significant proportion of unsolicited bulk e-mail messages.

The change of the user's temporary e-mail address can be communicated to directories or other sources of e-mail addressees by any suitable means. The service provider, ISP, registrar or hosting company may offer a range of options to the user in this regard. Alternatively, the user may have a customized service according to his or her particular needs and habits. For instance, when the user's temporary e-mail address is changed, the service provider, ISP, registrar or hosting service operating the address generating e-mail server can inform a directory of the user's new temporary e-mail address. Typically, the service provider, ISP, registrar or hosting service is the registrar of the user's domain name. In such circumstances, the service provider, ISP, registrar or hosting service automatically updates the "whois" database with the user's temporary e-mail address each time it changes. As such, any database of e-mail addresses created from a "whois" database and obtained by a sender of bulk e-mail therefore includes the e-mail user's temporary e-mail address but not his or her permanent address. Senders of bulk e-mail who have obtained the user's e-mail address from the "whois" database have an operational address only until such time as the user's temporary e-mail address is changed.

If the user is notified when his or her temporary e-mail address has changed and is informed of the temporary address, the user may also provide his or her temporary e-mail address to one or more directories on an ongoing or intermittent basis, or to a third party when that user wishes to receive e-mail messages from that third party on a short-term, but not long term, basis.

In addition to reducing the amount of unsolicited bulk e-mail received by a user, the invention is also effective to provide anonymity and privacy to the user. The invention may be used to meet either or both of these objectives. The invention is effective to provide anonymity because a person sending an e-mail message to a temporary e-mail address has no means of identifying the addressee.

This present invention has been described with reference to various preferred embodiments, however, it will be readily understood to a person of ordinary skill in the art that various changes and modifications may be made without departing from the spirit of the invention.

The invention claimed is:

1. A system for enabling an e-mail user to avoid receipt of an e-mail message comprising:
   a first server means for receiving an e-mail message sent to a first e-mail address associated with the user;
   a second server means for linking said first e-mail address to a second e-mail address associated with the user;
   a third server means for forwarding said e-mail message from said first server means to said second e-mail address; and
   a fourth server means for receiving said e-mail message from said second server means and forwarding said e-mail message to the user,
   wherein said second server means is capable of de-linking said first e-mail address from said second e-mail address to avoid receipt by the user of an e-mail message sent to said first e-mail address.

2. The system defined by claim 1 further comprising a means for generating a succession of first e-mail addresses and linking said generated first e-mail addresses to said second e-mail address for an interval.

3. The system of claim 2 wherein said succession of first e-mail addresses are randomly generated.

4. The system of claim 2 wherein said interval is a fixed period of time.

5. The system of claim 2 wherein said interval is based on the receipt at said first e-mail address of a fixed number of e-mail messages.

6. The system of claim 2 wherein said interval is terminated upon the request of the e-mail user or other person.

7. The system of claim 2 wherein each of said generated e-mail addresses has a random portion and a non-random portion.

8. The system of claim 2 wherein the user is notified when the first e-mail address linked to the second e-mail address is de-linked from said second e-mail address.

9. The system of claim 8 wherein the user is notified of the first e-mail address generated and linked to said second e-mail address.

10. The system of claim 9 wherein the user is notified by means of an e-mail message received at said second e-mail address.

11. The system of claim 8 wherein the user is notified by means of an e-mail message received at said second e-mail address.

12. The system of claim 2 wherein the first e-mail address generated and linked to said second e-mail address is communicated to a register for storing e-mail addresses.

13. The system of claim 1 wherein said second server means comprises a table for linking said first e-mail address to said second e-mail address.

14. The system of claim 1 wherein said second server means comprises a remote lookup facility for linking said first e-mail address to said second e-mail address.

15. A method for enabling an e-mail user to avoid receipt of an e-mail message comprising:
   receiving at a first server an e-mail message sent to a first e-mail address associated with the user;
   linking said first e-mail address to a second e-mail address associated with the user;
   forwarding said e-mail message from said first server to said second e-mail address at a second server; and
   receiving said e-mail message from said second server and forwarding said e-mail message to the user,
   de-linking said first e-mail address from said second e-mail address to avoid receipt by the user of an e-mail message sent to said first e-mail address.

16. The method defined by claim 15 further comprising the step of generating a succession of first e-mail addresses and linking said generated first e-mail addresses to said second e-mail address for an interval.

17. The method of claim 16 wherein said succession of first e-mail addresses are randomly generated.

18. The method of claim 16 wherein said interval is a fixed period of time.

19. The method of claim 16 wherein said interval is based on the receipt at said first e-mail address of a fixed number of e-mail messages.

20. The method of claim 16 wherein said interval is terminated upon the request of the e-mail user or other person.

21. The method of claim 16 wherein each of said generated e-mail addresses has a random portion and a non-random portion.

22. The method of claim 16 wherein the user is notified when the first e-mail address linked to the second e-mail address is de-linked from said second e-mail address.

23. The method of claim 22 wherein the user is notified of the first e-mail address generated and linked to said second e-mail address.

24. The method of claim 23 wherein the user is notified by means of an e-mail message received at said second e-mail address.

25. The method of claim 22 wherein the user is notified by means of an e-mail message received at said second e-mail address.

26. The method of claim 16 wherein the first e-mail address generated and linked to said second e-mail address is communicated to a register for storing e-mail addresses.

27. The method of claim 15 wherein said first e-mail address and/or said generated first e-mail address is linked to said second e-mail address by a table means.

28. The method of claim 15 wherein said first e-mail address and/or said generated first e-mail address is linked to said second e-mail address by means of a remote lookup facility.

* * * * *